United States Patent
Nagai et al.

[11] Patent Number: 5,745,470
[45] Date of Patent: Apr. 28, 1998

[54] HEAD MOVING APPARATUS WHICH CANCELS LEAKAGE FLUX

[75] Inventors: Koichi Nagai, Chigasaki; Hidenori Sai, Yokohama, both of Japan

[73] Assignee: Kabushiki Kaisha Toshiba, Kawasaki, Japan

[21] Appl. No.: 655,163

[22] Filed: May 30, 1996

[30] Foreign Application Priority Data

May 31, 1995 [JP] Japan ................. 7-132468

[51] Int. Cl.⁶ ................. G11B 7/085; G11B 21/02
[52] U.S. Cl. ................. 369/219; 369/249; 359/824
[58] Field of Search ................. 369/215, 219, 369/244, 249, 220, 258, 44.14, 44.15, 44.16, 44.21, 44.22; 359/814, 823, 824

[56] References Cited

U.S. PATENT DOCUMENTS

| | | | |
|---|---|---|---|
| 4,504,935 | 3/1985 | Jansen | 369/220 |
| 4,698,798 | 10/1987 | Faber et al. | 369/249 |
| 4,763,314 | 8/1988 | McCaslin et al. | 369/249 |
| 5,138,605 | 8/1992 | Shtipelman et al. | 369/215 |
| 5,278,820 | 1/1994 | Shtipelman | 369/219 |
| 5,361,243 | 11/1994 | Kasahara | 369/44.15 |
| 5,563,853 | 10/1996 | Ishii | 369/44.14 |

FOREIGN PATENT DOCUMENTS

| | | | |
|---|---|---|---|
| 5298722 | 11/1993 | Japan | 369/244 |
| 5314498 | 11/1993 | Japan | 369/244 |

*Primary Examiner*—Stuart S. Levy
*Assistant Examiner*—David L. Ometz
*Attorney, Agent, or Firm*—Cushman, Darby & Cushman IP Group of Pillsbury Madison & Sutro LLP

[57] ABSTRACT

A focus driving coil is fixed to an objective lens for record/reproduction of an optical disk, and the objective lens is provided on a carriage together with the focus driving coil. The carriage is movable by a bearing contacting a guide rail, and the bearing and the carriage are guided to a predetermined direction by the guide rail. In the guide rail, a radial driving coil is provided to be inserted to the guide rail, and a radial yoke magnetically contacting the guide rail is provided. A radial driving magnet is fixed to the radial yoke, and a focus driving magnet is provided in the radial driving magnet so as to be magnetized in a direction opposite to a direction of magnetization of the radial driving magnet through the guide rail.

18 Claims, 4 Drawing Sheets

HEAD MOVING APPARATUS WHICH CANCELS LEAKAGE FLUX

BACKGROUND OF THE INVENTION

1. Field of the Invention

The present invention relates to a head moving apparatus which is applied to a recording system having a data recording medium, such as a disk or a card. In particular, the present invention relates to a head moving apparatus for positioning a head, which selectively records and reproduces data, to a desired position.

2. Description of the Related Art

Conventionally, in an apparatus for reading data from a data recording medium, a head moving apparatus is used to position a head. The recording medium can be formed by an optical disk, an optical card, or a reading and writing apparatus for selectively reading and writing data using the data recording medium. The head moving apparatus positions the head to a desired position. The head reads or writes data by irradiating the data recording medium with a laser beam.

For example, where the optical disk is used as a data recording medium, the head moving apparatus moves the head to provide the irradiation of the laser beam to a desired position on a surface of the data recording medium by use of Lorentz's force. The Lorentz's force is generated by allowing a current to flow into a predetermined coil. Also, the head moving apparatus moves the head in a direction perpendicular to the surface of the data recording medium so that a focal point of the laser beam is adjusted to the desired position.

For example, the above-mentioned head moving apparatus is used in a compact disk drive device, a CD-ROM drive device, a MO (Magneto Optical) disk drive, or a PC (Phase Change) disk drive.

In recent years, there has been a desire that such types of devices be miniaturized and lightened. For the miniaturization and lightening of these types of devices, the head moving apparatus must be constructed out of a small number of structural members. In other words, it is important to miniaturize the head moving apparatus itself. Also, the performance of the head moving apparatus must be provided so that it is not lowered. However, it is difficult to accomplish the miniaturization of the head moving apparatus without deteriorating the performance of the head moving apparatus. Particularly, it is difficult to miniaturize the moving head apparatus without reducing the head moving speed.

SUMMARY OF THE INVENTION

It is an object of the present invention to provide a head moving apparatus, which can be miniaturized without lowering the performance of positioning a head.

It is a second object of the present invention to provide a head moving apparatus which has a structure such that members which support the head are not easily magnetized, and the head can be driven in a radial direction at high speed.

According to a first aspect of the present invention, there is provided a head moving apparatus including a head portion which selectively records and reproduces data to/from a recording medium, and a support mechanism having a ferromagnetic member, which supports movement of the head portion. A guide rail contacting the support mechanism guides movement of said support mechanism to a predetermined direction together with the head portion. A first electromagnetic driving element has a first magnet magnetized in a first direction and generates magnetic flux. The magnetic flux produces the driving force necessary to move the head portion to said predetermined direction. A second electromagnetic driving element, having a second magnet magnetized in a second direction different from said first direction, generates magnetic flux. The magnetic flux from the second magnet generates the driving force to move the head portion in a direction perpendicular to the recording medium.

According to a second aspect of the present invention, there is provided a head moving apparatus including: a head portion which selects recording and reproducing data to/from a recording medium. A support mechanism, having a ferromagnetic member, supports a movement of said head portion. A guide rail, contacting the support mechanism, guides movement of the support mechanism to a predetermined direction together with the head portion. A yoke magnetically connects to the guide rail. A first electromagnetic driving element having a first magnet fixed to the yoke, generates a part of magnetic flux necessary to produce the driving force to move the head portion to the predetermined direction. The head portion passes through a magnetic circuit formed of the first magnet, the guide rail, and the yoke. A second electromagnetic driving element having a second magnet generates a part of magnetic flux necessary to produce the driving force for moving the head portion in a direction perpendicular to the recording medium. Thus, leakage flux provided from said magnetic circuit is canceled.

According to the above-mentioned structure, the direction of magnetization of the first magnet is opposite to that of the second magnet. Thus, magnetic flux can be canceled out. Also, the magnetic flux leakage to the second magnet from the magnetic circuit, including the first magnet and the yoke, can be reduced. As a result, the influence of the leakage flux is controlled, and the head moving apparatus having a high driving force and a high acceleration can be realized.

In other words, the direction of magnetization of the focus driving magnet is set to the direction which is opposite to the radial driving magnet. Thus, leakage flux of the peripheral portion of the bearing can be reduced, and the running resistance of the carriage, which is caused by the magnetization of the bearing, can also be reduced.

Therefore, it is possible to manufacture the radial magnetic circuit in which strong magnetic flux can be applied to the coil, as compared with conventional circuits. Thus, a head moving apparatus in which the head can be moved in the radial direction at a high acceleration and a high speed can be obtained. Also, since the focus magnetic circuit and the radial magnetic circuit can be located close to each other, a small-sized head moving apparatus can be obtained.

Moreover, the radial yokes can be miniaturized. Thus, the needed rigidity of the head moving apparatus can be ensured. Also, the apparatus can be miniaturized in the height direction of each of the various memory devices in which the present invention is applied.

Additional objects and advantages of the invention will be set forth in the description which follows, will be obvious from the description, or may be learned by practice of the invention. The objects and advantages of the invention may be realized and obtained by means of the instrumentality's and combinations set forth in the appended claims.

BRIEF DESCRIPTION OF THE DRAWINGS

The accompanying drawings, which are incorporated in and constitute a part of the specification, illustrate the presently preferred embodiments of the invention. The general description given above, the detailed description of the preferred embodiments given below and the accompany drawings, serve to explain the principles of the invention.

DETAILED DESCRIPTION OF THE PREFERRED EMBODIMENTS

The first, second and third embodiments of the present invention will be explained with reference to the drawings.

Figure 1A:
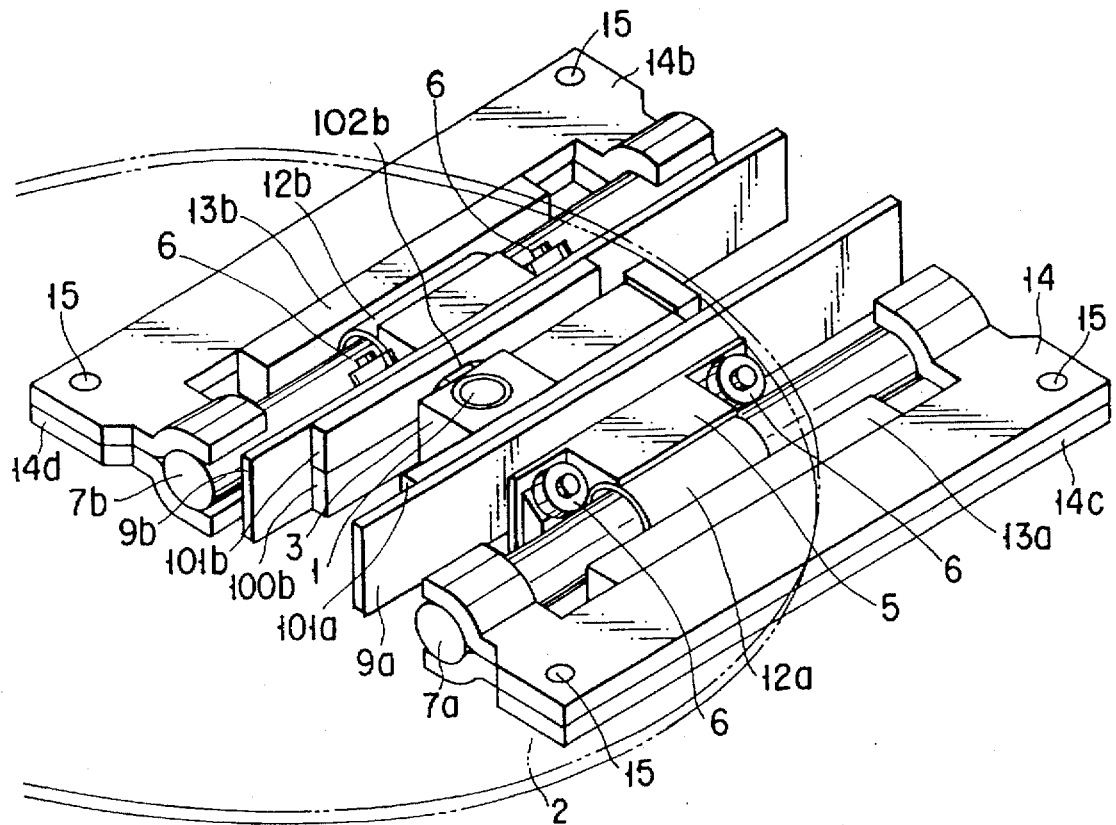
FIGS. 1A and 1B are perspective views showing the structure of a first embodiment of a head moving apparatus of the present invention.
Figure 1B:
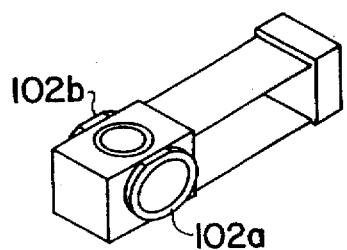

The following discussions describe a head moving apparatus of a first embodiment of the present invention with reference to FIGS. 1A-1B. FIG. 1A is a perspective view showing the head moving apparatus of the first embodiment. FIG. 1B is a detailed perspective view of the focus driving coils of the head moving apparatus shown in FIG. 1A.

A laser beam, which is emitted from a laser beam emitting source (not shown), is guided to an objective lens 1 through optical elements such as a collimator lens, a beam splitter, and a mirror. The laser beam is focused on an optical disk 2. Light reflected on the optical disk 2 is passed through the objective lens 1, and reaches a light receiving element (not shown) through optical elements such as a mirror and a beam splitter. The objective lens 1 is fixed to an objective lens holder 3.

The objective lens holder 3 is connected to a carriage 5 by a parallel-leaf spring so as to be movably held to a direction which is perpendicular to a surface of the optical disk 2. Focus driving coils 102a and 102b (see FIG. 1B) are attached to both ends of the objective lens holder 3. The lens holder 3 is held by the carriage 5. In this specification, the structural elements such as the lens holder 3, which includes the carriage 5, are hereinafter called the "head".

First focus driving magnets 100a and 100b are attached to focusing yokes 9a and 9b, which are fixed to a base (not shown). The second focus driving magnets 101a and 101b are arranged respectively such that their directions of magnetization are opposite to each other.

Also, the directions of magnetization of the focus driving magnets 100a, 100b, 101a and 101b are positioned to be parallel to a plane surface of the optical disk 2.

Bearings 6, which are roller members having a ferromagnetic member, are attached to the carriage 5 so as to come in contact with guide rails 7a and 7b. The carriage 5 is movable to a direction which is parallel to the surface of the optical disk 2. Radial driving coils 12a and 12b are attached to the carriage 5. The guide rails 7a and 7b, each which comprises the ferromagnetic member fixed to the base, are provided to be passed through the radial driving coils 12a and 12b. Also, U-shaped radial yokes 14a, 14b, 14c, and 14d are arranged to be magnetically connected to both ends of the guide rails 7a and 7b.

Moreover, radial driving magnets 13a and 13b are connected to the radial yokes 14a, 14b, 14c, and 14d.

Furthermore, the radial yokes 14a and 14c are paired, and the radial yokes 14b and 14d are paired.

Each pair is attached to the base through a fixing screw is hole 15.

The following discussion describes an operation of the head moving apparatus noted above.

A current is allowed to flow into the radial driving coils 12a and 12b. Thereby, Lorentz's force is generated, and the carriage 5 is moved in a direction which is parallel to the surface of the optical disk 2.

Thus, the focal point of the laser beam is moved to a desired position on the surface of the optical disk 2.

Moreover, a current is allowed to flow in the focus driving coils 102a and 102b. Thereby, Lorentz's force is generated in the focus driving coils 102a and 102b in the direction, which is perpendicular to the surface of the optical disk 2. As a result, the objective lens 1 is movable to the direction which is perpendicular to the surface of the optical disk 2. In this case, the objective lens is moved by a controller (not shown) such that the focal point of the laser beam is adjusted to a desired track of the optical disk 2.

Figure 2A:
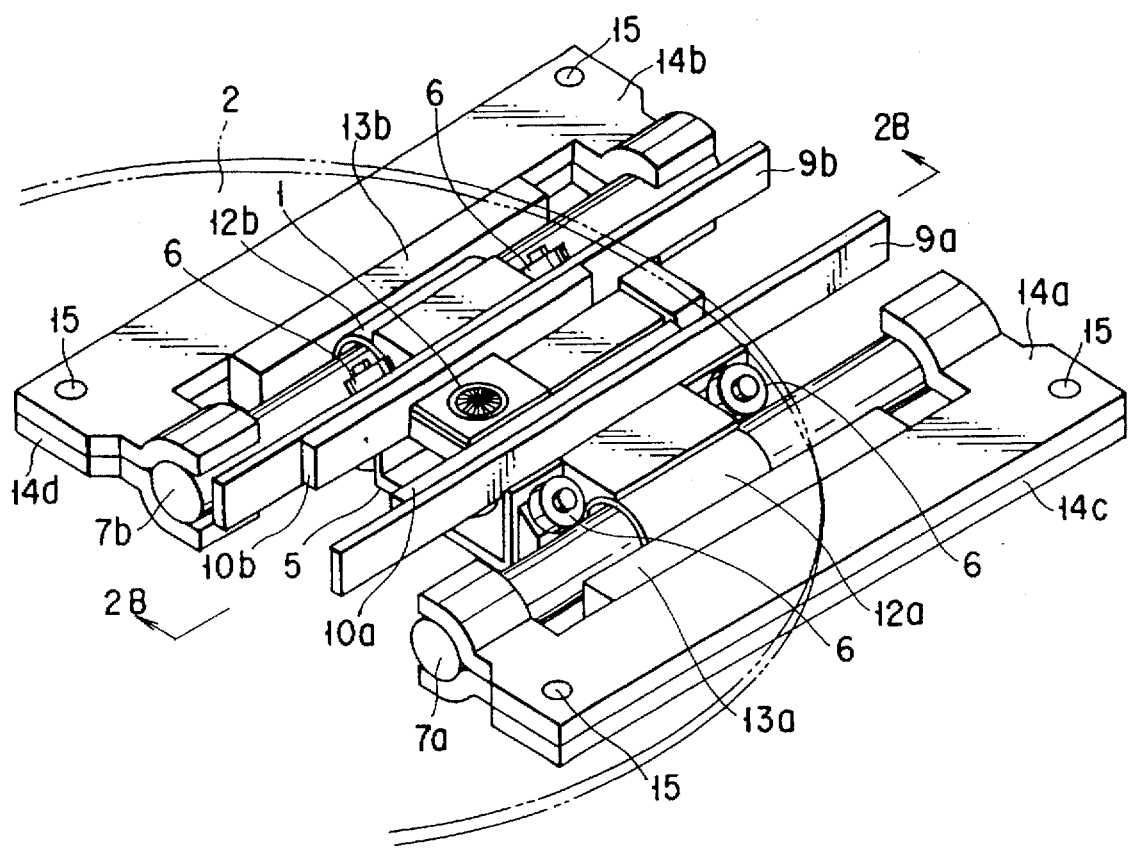
FIGS. 2A and 2B are perspective views showing the structure of a second embodiment of the head moving apparatus of the present invention.
Figure 2B:
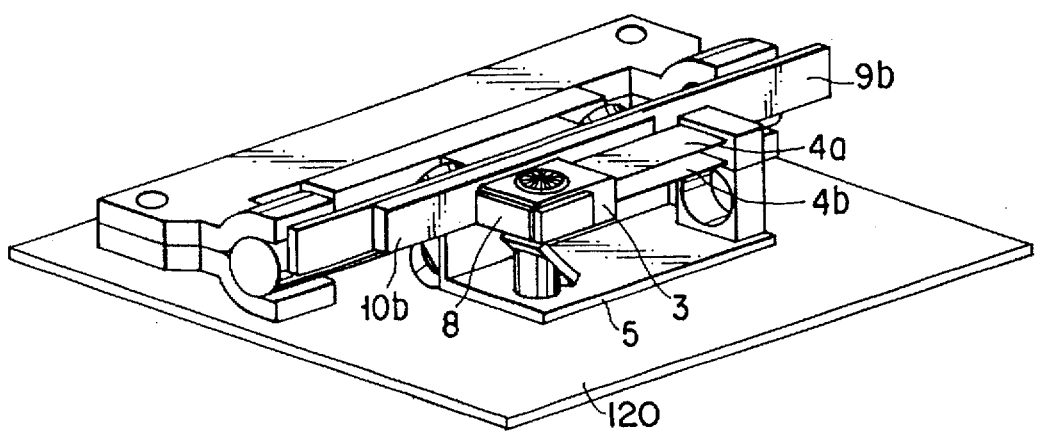

The following will explain a second embodiment of the head moving apparatus of the present invention with reference to FIGS. 2A and 2B. FIG. 2A is a perspective view of the head moving apparatus of the second embodiment. FIG. 2B is a perspective view of the head moving apparatus whose right-half portion is cut along line 2B—2B' of FIG. 2A.

The laser beam, which is emitted from the laser beam emitting source (not shown), is passed through the objective lens 1 (head portion), and controlled to be focused on the optical disk 2 (data recording medium). Light reflected on the optical disk 2 is passed through the objective lens 1 again. The reflected light reaches the light receiving element (not shown) through the optical elements such as the mirror and the beam splitter. The objective lens 1 is fixed to the objective lens holder 3.

The objective lens holder 3 is connected to the carriage 5 by the parallel-leaf springs 4a and 4b so as to be movably held to a direction which is perpendicular to the surface of the optical disk 2. A focus driving coil (first coil) 8 is attached to the objective lens holder 3 in a state that the focus driving coil is wound around an optical axis of the objective lens 8.

The focus driving magnets 10a and 10b are attached to the focus yokes 9a and 9b fixed to the base 120. The focus driving magnets (second permanent magnets) 10a and 10b are arranged such that their directions of magnetization are opposite to each other.

The directions of magnetization of the focus driving magnets 10a and 10b are parallel to the surface direction of the optical disk 2.

Bearings (support members) 6, which are the roller members having at least a ferromagnetic member, are attached to the carriage 5 so as to comes in contact with the guide rails 7a and 7b.

The carriage 5 is guided to be movable in the direction which is parallel to the surface of the optical disk 2. The wound cylindrical radial driving coils 12a and 12b (second coil) are attached to the carriage 5. The guide rails 7a and 7b, each of which comprises the ferromagnetic member fixed to the base 120, are inserted to a hollow portion of the radial driving coils 12a and 12b, respectively.

Also, the radial yokes 14a, 14b, 14c, and 14d, which are curved substantially along the curved surfaces of the guide rails 7a and 7b, are provided at the end portions of a U-shaped plate, which is formed of the ferromagnetic member. In order that their curved portions come in substantially contact with the guide rails 7a and 7b, the radial yokes 14a and 14c, 14b and 14d are respectively overlaid each other to be fixed to the base by tightening a screw through the screw hole 15.

Moreover, the radial driving magnet (first permanent magnet) 13a is attached to the radial yokes 14a and 14b, and the radial driving magnet (first permanent magnet) 13b is attached to the radial yokes 14b and 14d. The direction of magnetization of each of the radial driving magnets 13a and 13b are provided to be parallel to the surface of the optical disk 2. The direction of magnetization of the radial driving magnets 13a is provided to be opposite to the direction of magnetization of the focus driving magnet 10a. Also, the direction of magnetization of the radial driving magnets 13b is provided to be opposite to the direction of magnetization of the focus driving magnet 10b.

The following discussion describes an operation of the head moving apparatus noted above.

First of all, a current is allowed to flow into the focus driving coil 8. Thereby, Lorentz's force is generated in a direction, which is perpendicular to the surface of the optical disk 2. Thus, the objective lens 1 can be moved to a direction which is perpendicular to the surface of the optical disk 2. Also, a current is allowed to flow into the radial drive coils 12a and 12b, so that Lorentz's force is generated. Then, by the electromagnetic force, the carriage 5 is moved in a direction, which is parallel to the surface of the optical disk 2. Thus, the focal point of the laser beam can be moved to a desired position on the surface of the optical disk 2.

Where the guide rails 7a, 7b, the radial yokes 14a and 14b, the radial driving magnets 13a and 13b, and the focus driving magnets 10a and 10b are formed of a material which is easily oxidized, plating may be provided to the surface of these elements to form an antioxidant film.

Figure 3A:
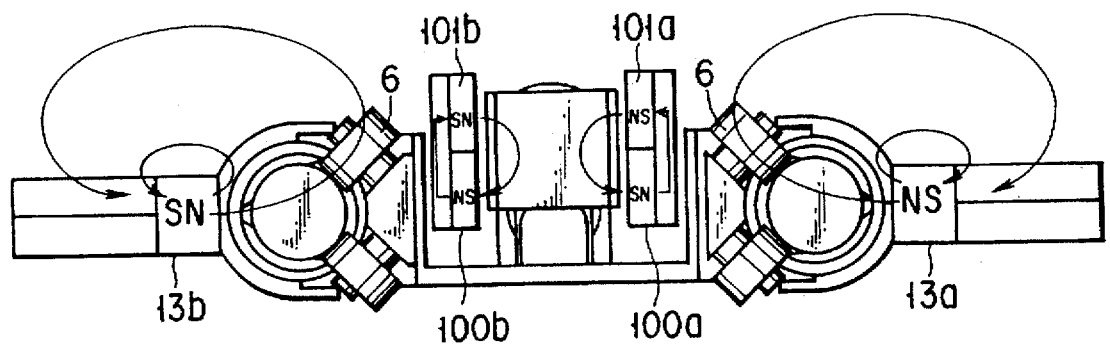
FIGS. 3A to 3C are schematic views each showing a direction of leakage flux of the head moving apparatus of the present invention.
Figure 3B:
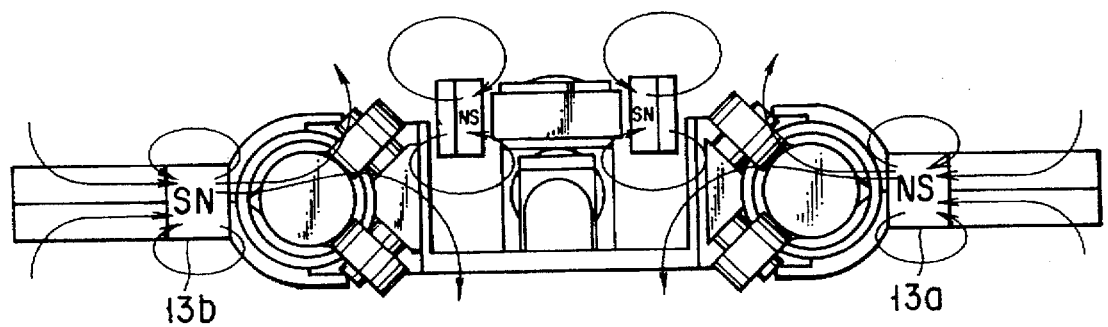

In the above-structured head moving apparatus, as shown in an arrow of FIG. 3B, the directions of magnetization of the focus driving magnets 10a and 10b are set to be opposite to those of the radial driving magnets 13a and 13b. Thus, magnetic flux is canceled. Therefore, magnetic flux, which is leaked from the magnetic circuit, which comprises the radial driving magnets 13a and 13b, and the guide rails 7a and 7b, is not guided to the bearings 6. Due to this, the magnetic flux leakage of the radial magnetic circuit which is provided between the focus driving magnets 10a, 10b and the guide rails 7a, 7b, can be reduced.

Figure 3C:
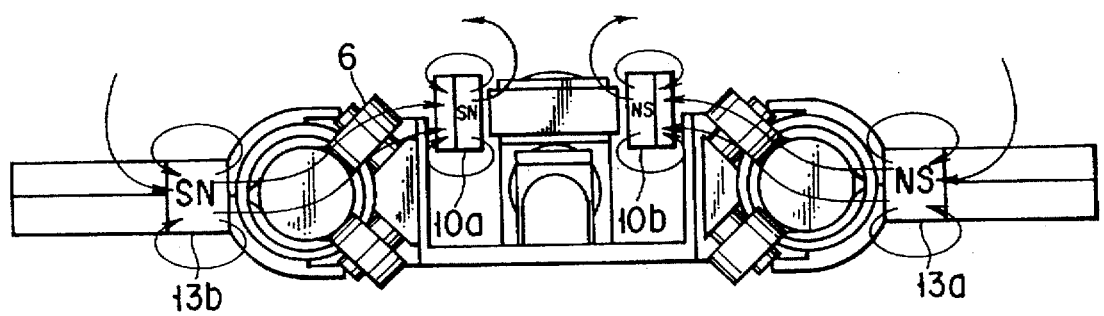

An arrow of FIG. 3A shows the flow of magnetic flux leakage of the radial magnetic circuit in the head moving apparatus of the first embodiment. FIG. 3C is a schematic view showing the flow of magnetic flux leakage of the radial magnetic circuit in a case where the directions of magnetization of the focus driving magnets 10a and 10b are set in the same directions of magnetization of the radial driving magnets 13a and 13b.

As is obvious from FIGS. 3A to 3C, the head moving apparatus is structured such that the directions of magnetization of the focus driving magnets 10a and 10b are set to be opposite to those of the radial driving magnets 13a and 13b respectively. Thus, magnetic flux leakage at the position of the bearing 6, which is provided between the focus driving magnets 10a and 10b and the guide rails 7a and 7b, can be reduced. Therefore, rotation resistance, which is caused by mutual magnetic absorption by the internal parts of the bearing 6, can be reduced. Moreover, magnetic absorption, which is caused between the guide rails 7a and 7b and the bearing 6, can be reduced. Thus, the rotation resistance of the bearing 6 can be reduced.

Due to this, the running resistance of the carriage 5 can be reduced, and the loss of driving force in the radial direction is controlled. Therefore, the control of the head portion movement, which is stabilized by high speed movement of the head, can be realized. Thus, the head is driven with high efficiency and low running resistance.

In the head moving apparatus, it is noted that the bearing 6 is preferably positioned between the focus driving magnet 10a and the radial driving magnet 13a, or between the focus driving magnet 10b and the radial driving magnet 13b.

In the carriage having eight bearings, the following table shows an example of a value which is obtained when the running resistance of the carriage is measured.

TABLE

|  | Polarity of FIG. 3B | Polarity of FIG. 3C |
| --- | --- | --- |
| Bearing 1 | 1.23E–2N | 2.03E–2N |
| Bearing 2 | 2.04E–2N | 2.75E–2N |

The above bearings 1 and 2 are two kinds of bearings, each having a different rotation resistance. Moreover, the above measurement shows the respective values of the head moving apparatus having the polarity 10 shown in the second embodiment (see FIG. 3B) and the head moving apparatus having the polarity (see FIG. 3C), which is opposite to the polarity of FIG. 3B. In the case of the polarity of FIG. 3B, frictional force of the bearings 1 and 2 can be reduced by 0.8E-2N, and 0.71E-2N, is respectively. That is, friction of 26% to 40% can be reduced as compared with the polarity of FIG. 3C.

Moreover, because the entire weight of the moving section is about 4 g, the acceleration of 1G is generated by a force of 3.92E-2N. Thus, the reduction of the frictional force of the second embodiment is sufficient to provide the advantage, of a stable control.

Furthermore, the radial yokes can be miniaturized. Thus, the needed rigidity for the head moving apparatus can be ensured. Also, the apparatus can be miniaturized in the height direction of each of the various memory devices in which the present invention is applied.

Figure 4A:
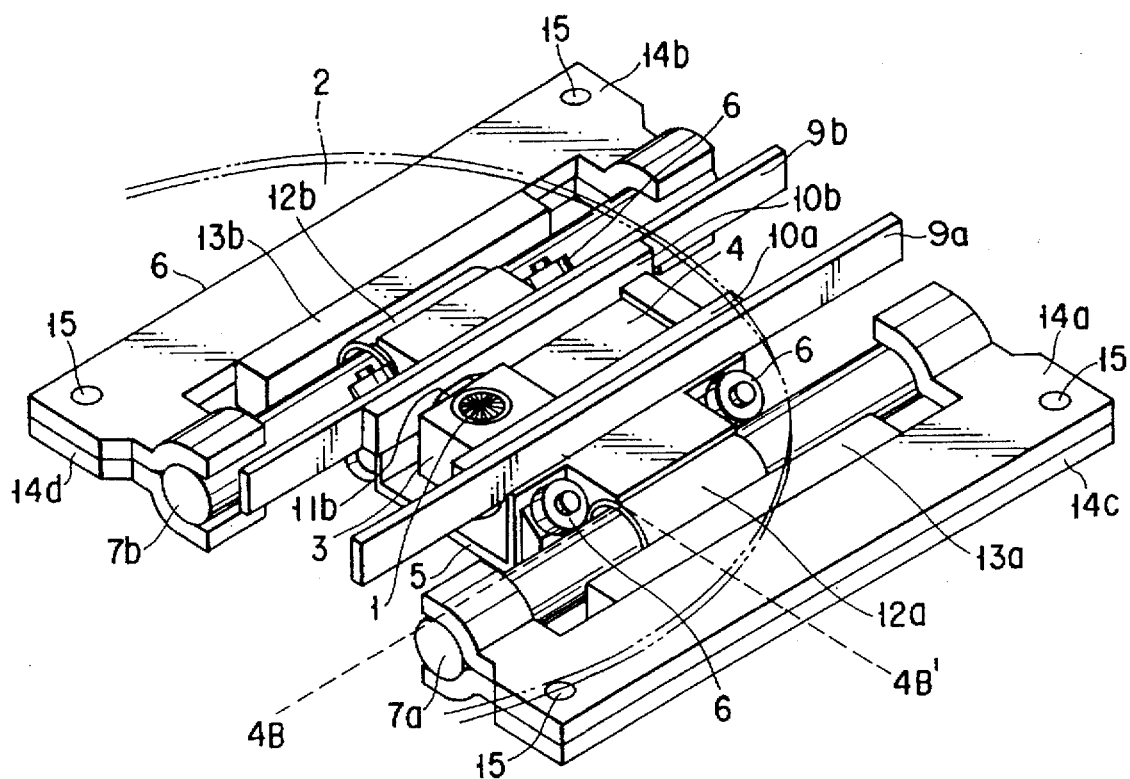
FIGS. 4A and 4B are perspective views showing the structure of a third embodiment of the head moving apparatus of the present invention.
Figure 4B:
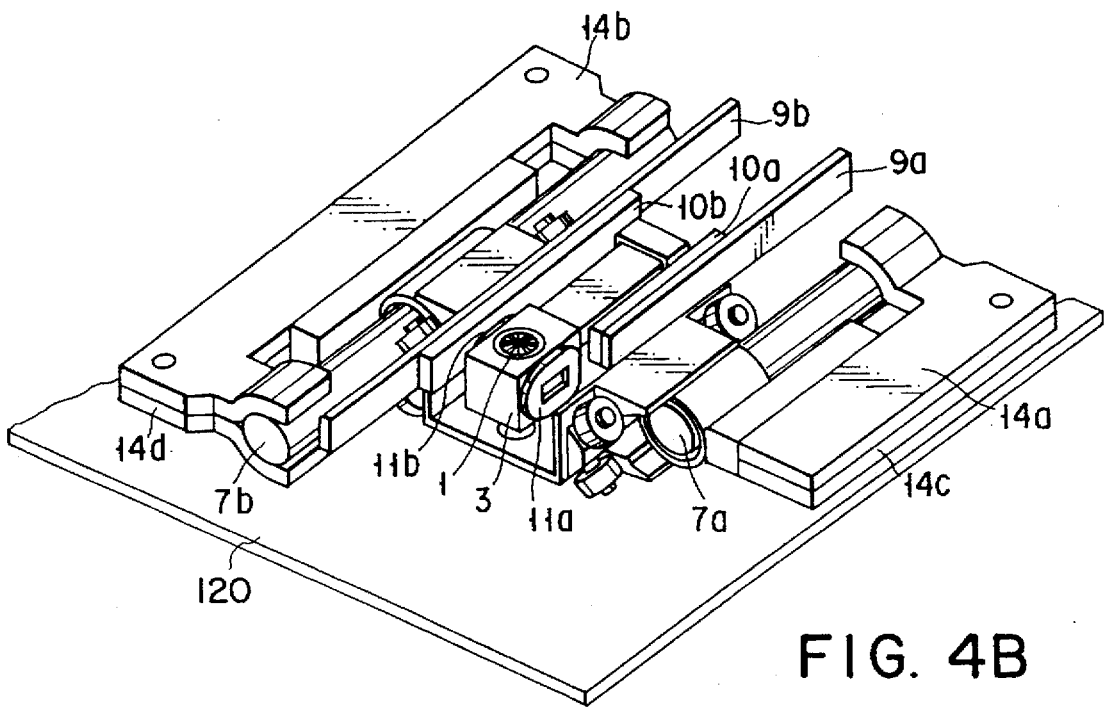

The following discussion describes a third embodiment of the head moving apparatus of the present invention with references to FIGS. 4A and 4B. FIG. 4A is a perspective view of the head moving apparatus of the third embodiment. FIG. 4B is a perspective view of the head moving apparatus whose right-half portion is cut along line 4B—4B' of FIG. 4A.

In the third embodiment, the focus driving coils are attached to both ends of the lens holder so that the directions of magnetization of the radial driving magnets and those of the focus driving magnets are set to be opposite to each other.

The laser beam, which is emitted from the laser beam emitting source (not shown), is guided to the objective lens (head portion) 1, and focused on the optical disk (data recording medium) 2. Light reflected on the optical disk 2 is passed through the objective lens 1, and reaches the light receiving element (not shown) through optical elements such as the mirror and the beam splitter. The objective lens 1 is fixed to the objective lens holder 3.

The objective lens holder 3 is connected to the carriage 5 by the parallel-leaf spring 4 so as to be movably held to a direction which is perpendicular to the surface of the optical disk 2. The focus driving coils (first coils) 11a and 11b, which are wound in a plane state, and are attached to the objective lens holder 3 so as to face to each other through the objective lens 1. The focus driving magnets 10a and 10b are respectively attached to the focus yokes 9a and 9b, which are fixed to the base (not shown).

The directions of magnetization of the focus driving magnets 10a and 10b are set to be parallel to the plane direction of the optical disk 2. Also, the direction of magnetization of the focus driving magnet 10a and that of the focus driving magnet 10b may be set to be opposite to each other, or be set a same direction.

The bearings (support member) 6, which are the roller members having at least a ferromagnetic member, are attached to the carriage 5 so as to come in contact with the guide rails 7a and 7b. The carriage 5 is movable to a direction which is parallel to the surface of the optical disk 2. The cylindrical radial driving coils (second coils) 12a and 12b are attached to the carriage 5. The guide rails 7a and 7b, having a ferromagnetic member fixed to the base of the radial driving coils 12a and 12b, are passed through the radial driving coils 12a and 12b.

Also, the radial yokes 14a, 14b, 14c, and 14d, which are curved substantially along the curved surfaces of the guide rails 7a and 7b, are provided at the end portions of the U-shaped plate, which is formed of the ferromagnetic member. In order that their curved portions come in substantially contact with the guide rails 7a and 7b, the radial yokes 14a and 14c, 14b and 14d are respectively overlaid each other to be fixed to the base by tightening the screw through the screw hole 15.

Moreover, the radial driving magnet (first permanent magnet) 13a is attached to the radial yokes 14a and 14b, and the radial driving magnet (first permanent magnet) 13b are attached to the radial yokes 14b and 14d. The direction of magnetization of each of the radial driving magnets 13a and 13b is provided to be parallel to the surface of the optical disk 2. The direction of magnetization of the radial driving magnets 13a is provided to be opposite to the direction of magnetization of the focus driving magnet 10a. Also, the direction of is magnetization of the radial driving magnets 13b is provided to be opposite to the direction of magnetization of the focus driving magnet 10b.

The following discussion describes an operation of the head moving apparatus noted above.

First of all, a current is allowed to flow into the focus driving coils 11a and 11b. Thus, Lorentz's force is generated in a direction, which is perpendicular to the surface of the optical disk 2, so that the objective lens 1 can be moved to a direction which is perpendicular to the surface of the optical disk 2. Also, a current is allowed to flow into the radial driving coils 12a and 12b, so that Lorentz's force is generated. Then, by the electromagnetic force, the carriage 5 is moved in a direction, which is parallel to the surface of the optical disk 2. Thus, the focal point of the laser beam can be moved to a desired position on the surface of the optical disk 2. In a case where the guide rails 7a, 7b, the radial yokes 14a and 14b, the radial driving magnets 13a and 13b, and the focus driving magnets 10a and 10b are formed of a material which is easily oxidized, a plating may be provided to the surface of the optical disk 2 to form an antioxidant film. Moreover, similar to the second embodiment, the bearing 6 is preferably positioned between the radial driving magnet and the focus driving magnet.

Similar to the second embodiment, the directions of magnetization of the focus driving magnets 10a and 10b of the head apparatus noted above are set to be opposite to those of the radial driving magnets 13a and 13b. Thus, magnetic flux leakage of the radial magnetic circuit generated between the focus driving magnets 10a, 10b and the guide rails 7a, 7b, which is the part of the radial magnetic circuit, can be reduced.

Therefore, the magnetic flux leakage at the position of the bearing 6, which is provided between the focus driving magnets 10a and 10b and the guide rails 7a and 7b, can be reduced. Also, rotation resistance, which is caused by the mutual magnetic absorption by the internal parts of the bearing 6, can be reduced. Moreover, magnetic absorption, which is caused between the guide rails 7a and 7b and the bearing 6, can be reduced. Thus, the rotation resistance of the bearing 6 can be reached.

Due to this, the running resistance of the carriage can be reduced, and the loss of driving force in the radial direction is controlled. Therefore, the control of the head portion movement, which is stabilized by high speed movement of the head, can be realized. Thus, the head is driven with high efficiency, and low running resistance.

Moreover, only the directions of the focus driving magnets 10a, 10b and those of the radial driving magnets 13a, 13b are set to be opposite to each other. Thus, the size of each of the focus driving magnets 10a and 10b can be reduced so that the peripheral portion of the optical is head portion is maintained as it is. Therefore, since the peripheral portion of the optical head portion can be reduced in size and weight, the entire head can be easily reduced in size and weight.

It is needless to say that the present invention is not limited to the above-mentioned embodiments. Various modifications can be made without deviating from the gist of the present invention. For example, the shape of the radial yoke may be formed to be something other than U-shaped. The magnetic circuit may be formed together with the guide rails and the radial driving magnets.

Moreover, if the guide rails are structured to reduce the magnetization of the bearing contacting the guide rails, the guide rails are not always formed of a ferromagnetic member. This construction is possible even in the case that the yokes are provided to be close to the outside of the guide rails.

Furthermore, in the above-mentioned first, second and third embodiments, the bearing was used as a member for supporting the head. However, the rollers, which are formed of the ferromagnetic member, can be used instead of the bearing. Also, bushings are available in place of the rollers.

Additional advantages and modifications will readily occur to those skilled in the art. Therefore, the invention in its broader aspects is not limited to the specific details, and illustrated examples shown and described herein. Accordingly, various modifications may is be made without departing from the spirit or scope of the general inventive concept as defined by the appended claims and their equivalents.

What is claimed is:

1. A head moving apparatus comprising:

a head portion for selectively recording and reproducing data to/from a recording medium;

a support mechanism, having a ferromagnetic member, for supporting movement of said head portion;

a guide rail, contacting said support mechanism, for guiding movement of said support mechanism to a predetermined direction together with said head portion;

a first electromagnetic driving element having a first magnet magnetized in a first direction so as to generate magnetic flux necessary for generating driving force for moving said head portion to said predetermined direction;

a second electromagnetic driving element having a second magnet which elongates along a longitudinal axis extending in said predetermined direction and over a moving distance of said head portion by said first electromagnetic driving element, and is magnetized in a second direction different from said first direction so as to generate magnetic flux necessary for generating driving force for moving said head portion in a direction perpendicular to said recording medium; and a base for fixing said guide rail, said first magnet and said second magnet on said apparatus.

2. The apparatus according to claim 1, wherein said first direction is opposite to said second direction.

3. The apparatus according to claim 1, wherein said first and second magnets are permanent magnets.

4. The apparatus according to claim 1, wherein said first electromagnetic driving element has a first coil having said guide rail inserted thereto so as to generate driving force in accordance with magnetic flux provided from said first magnet, and said second electromagnetic driving element having a second coil connected to said head portion so as to generate driving force in accordance with magnetic flux provided from said second magnet.

5. The apparatus according to claim 1, wherein said first electromagnetic driving element has a coil having said guide rail inserted thereto so as to generate driving force in accordance with magnetic flux provided from said first magnet, and said second electromagnetic driving element having a plurality of coils connected to said head portion so as to generate driving force in accordance with magnetic flux provided from said second magnet.

6. The apparatus according to claim 1, wherein said support mechanism includes a roller member rotating on said guide rail.

7. The apparatus according to claim 1, wherein said support mechanism includes a slide member sliding on said guide rail.

8. The apparatus according to claim 1, wherein:

said first electromagnetic driving element has a first coil so as to generate driving force in accordance with magnetic flux provided from said first magnet;

said second electromagnetic driving element having a second coil connected to said head portion so as to generate driving force in accordance with magnetic flux provided from said second magnet;

said first coil is moved with said head portion in said predetermined direction; and said second coil is moved with said head portion in said direction perpendicular to said recording medium.

9. A head moving apparatus comprising:

a head portion for selectively recording and reproducing data to/from a recording medium;

a support mechanism, having a ferromagnetic member, for supporting movement of said head portion;

a guide rail, contacting said support mechanism, for guiding movement of said support mechanism to a predetermined direction together with said head portion;

a yoke magnetically connected to said guide rail;

a first electromagnetic driving element having a first magnet fixed to said yoke, for generating a part of magnetic flux, necessary for generating driving force for moving said head portion to said predetermined direction, so as to be passed through a magnetic circuit formed of said first magnet, said guide rail, and said yoke;

a second electromagnetic driving element having a second magnet for generating a part of magnetic flux, necessary for generating driving force for moving said head portion in a direction perpendicular to said recording medium, so as to cancel out leakage flux provided from said magnetic circuit, said second magnet elongating along a longitudinal axis extending in said predetermined direction and over a moving distance of said head portion by said first electromagnetic driving element; and a base for fixing said guide rail, said first magnet and said second magnet on said apparatus.

10. The apparatus according to claim 9, wherein said first direction is opposite to said second direction.

11. The apparatus according to claim 9, wherein said first and second magnets are permanent magnets.

12. The apparatus according to claim 9, wherein said first electromagnetic driving element has a first coil having said guide rail inserted thereto so as to generate driving force in accordance with magnetic flux provided from said first magnet, and said second electromagnetic driving element having a second coil connected to said head portion so as to generate driving force in accordance with magnetic flux provided from said second magnet.

13. The apparatus according to claim 9, wherein said first electromagnetic driving element has a coil having said guide rail inserted thereto so as to generate driving force in accordance with magnetic flux provided from said first magnet, and said second electromagnetic driving element having a plurality of coils connected to said head portion so as to generate driving force in accordance with magnetic flux provided from said second magnet.

14. The apparatus according to claim 9, wherein said support mechanism includes a roller member rotating on said guide rail.

15. The apparatus according to claim 9, wherein said support mechanism includes a slide member sliding on said guide rail.

16. The apparatus according to claim 9, wherein said leakage flux is canceled out at the portion of said head moving apparatus located between said guide rail and said second magnet.

17. The apparatus according to claim 9, wherein said leakage flux is canceled out at the position of the support mechanism, wherein the support mechanism is located between said guide rail and said second magnet.

18. The apparatus according to claim 9, wherein said first electromagnetic driving element has a first coil so as to generate driving force in accordance with magnetic flux provided from said first magnet;

said second electromagnetic driving element having a second coil connected to said head portion so as to generate driving force in accordance with magnetic flux provided from said second magnet; said first coil is moved with said head portion in said predetermined direction; and said second coil is moved with said head portion in said direction perpendicular to said recording medium.

* * * * *